UNITED STATES PATENT OFFICE 1,928,725

WOOL DYESTUFFS OF THE ANTHRAQUINONE SERIES AND PROCESS OF MAKING SAME

Ernst Honold, Frankfort-on-the-Main-Fechenheim, and Klaus Weinand, Cologne-Flittard, Germany, assignors to General Aniline Works Inc., New York, N. Y., a corporation of Delaware No Drawing. Application June 28, 1929, Serial No. 374,611, and in Germany July 5, 1928

3 Claims. (Cl. 260—59)

Our present invention relates to new wool dyestuffs of the anthraquinone series which correspond probably to the general formula

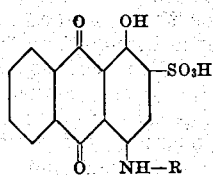

wherein R means an alkyl, cycloalkyl, aralkyl, aryl or acyl group.

They are obtained according to our process by condensing an 1-hydroxy-4-halogen-anthraquinone-2-sulfonic acid of the general formula

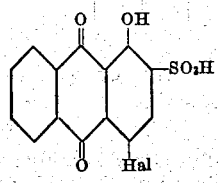

with a compound which contains an exchangeable hydrogen atom linked to nitrogen and corresponds to the general formula R-NH₂, wherein R has the above significance.

The addition of a catalyst, such as copper or a coppersalt, facilitates the reaction. The same effect is also produced by the application of the copper salt of the 1-hydroxy-4-halogen-anthraquinone-2-sulfonic acid which is prepared by heating 1-diazo-4-halogen-anthraquinone-2-sulfonic acid with copper or a copper salt in the manner described in U. S. Patent No. 1,886,017, issued November 1, 1932.

The new dyestuffs show good properties of fastness. Their shades vary according to the nitrogen compounds applied; aromatic and aliphatic amines yield violet to blue dyestuffs, whereas reddish products are obtained by using acid amides.

In order to further illustrate our invention the following examples are given, the parts being by weight and all temperatures in centigrade degrees. But we wish it to be understood that we are not limited to the particular conditions nor specific products mentioned therein.

Example 1

40 parts of the sodium salt of 1-hydroxy-4-bromo-anthraquinone-2-sulfonic acid, 16 parts of sodium carbonate and 1 part of copper sulfate are dissolved together in 800 parts of water and the solution is mixed with 30 parts of benzene sulfamide. The reaction mass is boiled under a reflux condenser for 1 hour. From the dark violet solution the sodium salt of 1-hydroxy-4-benzene sulfamido-anthraquinone-2-sulfonic acid is precipitated by means of common salt. For purification it is dissolved in water with the addition of an acid and again precipitated therefrom by means of common salt.

The new dyestuff corresponds probably to the formula

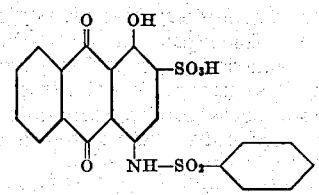

It dyes wool uniform orange shades. It dissolves in concentrated sulfuric acid to a red solution. By a longer action of sulfuric acid, especially at a higher temperature, the benzene-sulfonic residue is split off and by adding water to the solution the known 1-hydroxy-4-amino-anthraquinone-2-sulfonic acid is isolated in a pure form.

Example 2

A solution of 20 parts of the sodium salt of 1-hydroxy-4-bromo-anthraquinone-2-sulfonic acid in 400 parts of water and 15 parts of sodium carbonate is mixed with 15 parts of aniline and 5 parts of copper powder. The reaction mixture is boiled under a reflux condenser for some hours. The excess of the aniline is removed by means of steam and the formed dyestuff is isolated by the addition of common salt. It may be purified in like manner as described in Example 1.

The new dyestuff corresponds probably to the formula

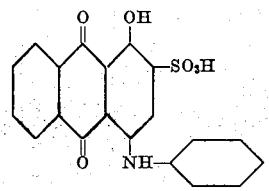

It has a very good levelling property and dyes wool blue shades of an excellent fastness. Its solution in sulfuric acid is feebly colored and becomes green upon the addition of para formaldehyde.

A similar dyestuff is obtained by replacing aniline by the corresponding amount of p-toluidine.

Example 3

A mixture of 40 parts of the sodium salt of 1-hydroxy-4-bromo-anthraquinone-2-sulfonic acid, 20 parts of hexahydroaniline, 30 parts of sodium carbonate, 1 part of copper powder and 1000 parts of water is heated under a reflux condenser for several hours until the reaction is finished. The dyestuff partly precipitated from the blue solution is entirely separated by the addition of common salt. It is purified by dissolving it in water and a small amount of a mineral acid and again precipitating therefrom by the addition of common salt. It corresponds probably to the formula

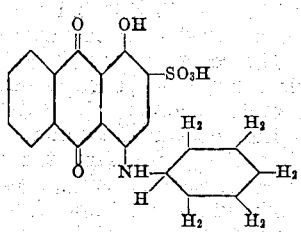

It represents when dry a blackish blue powder, soluble in concentrated sulfuric acid with a light orange tint which becomes green upon the addition of para formaldehyde especially at elevated temperature. Its dyeing on wool is bluish violet and shows remarkable properties of fastness.

When in this example hexahydroaniline is replaced by the corresponding amounts of benzylamine or butylamine, analogous dyestuffs are obtained.

Example 4

A solution of 30 parts of copper sulfate in 400 parts of water is allowed to run into a solution of 100 parts of 1-hydroxy-4-bromo-anthraquinone-2-sulfonic acid in 100 parts of sodium carbonate and about 2000 parts of water. Thereby the copper compound of 1.hydroxy-4-bromo-anthraquinone-2-sulfonic acid is formed which separates in a finely divided state as a difficulty soluble substance. To the suspension thus obtained 50 parts of 4.amino-1.acetylamino-benzene dissolved in 500 parts of water are added and the mixture is heated to 90–100° for several hours while well stirring. Then the difficulty soluble copper compound of the new condensation product is filtered off and washed with water. This compound, being when dried in the air a nearly black powder, is dissolved in concentrated sulfuric acid and the solution is warmed for a short time on the water bath. The formed dyestuff is isolated by pouring the sulfuric acid solution into ice-water and adding common salt. It represents probably the sodium salt of 1.hydroxy-4.(4'.amino-phenyl-amino)-anthraquinone-2.sulfonic acid of the formula

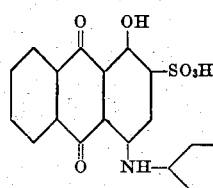

and dyes wool from an acid bath clear navy-blue shades of an excellent fastness. The dyestuff shows a remarkable levelling property. It dissolves in concentrated sulfuric acid with a light yellow tint turning green upon the addition of paraformaldehyde.

The dyestuff prepared in an analogous manner from acetylmeta-toluylene diamine instead of acetyl para phenylene diamine dyes wool from the sulfuric acid bath dark bluish violet shades and levels likewise well.

Example 5

20 parts of 1-hydroxy-4-bromo-anthraquinone-2.sulfonic acid are converted into the copper compound as described in Example 4 and the alkaline suspension thus obtained is condensed by boiling it for several hours with 20 parts of 1.3.-diamino-benzene. The copper lacquer nearly insoluble in water of the condensation product thus formed is filtered and washed. The residue is again heated to boiling with dilute hydrochloric acid and the dyestuff, freed from copper and difficultly soluble in the dilute hydrochloric acid, is filtered off. The new dyestuff corresponds probably to the formula

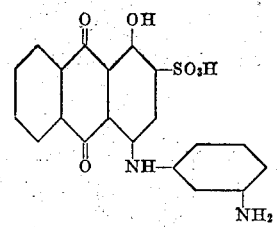

It dissolves in dilute feeble alkalies with a blue tint and dyes wool from an acid (advantageously acetic acid) bath fast bluish grey shades. The color of its solution in concentrated sulfuric acid is feebly brownish and turns to blue after the addition of para formaldehyde.

We claim:

1. A process which comprises condensing the copper compound of an 1-hydroxy-4-halogen-anthraquinone-2-sulfonic acid of the general formula

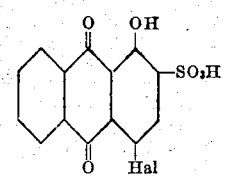

prepared by heating 1-diazo-4-halogen-anthraquinone-2-sulfonic acid with copper or copper salt with a compound which contains an exchangeable hydrogen atom linked to nitrogen and corresponds to the general formula R-NH$_2$, wherein R means an alkyl, cycloalkyl, aralkyl, aryl or acyl group.

2. A process which comprises condensing the copper compound of 1-hydroxy-4-bromo-anthraquinone-2-sulfonic acid of the formula

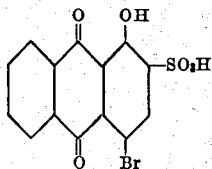

prepared by heating 1 diazo-4-halogen-anthraquinone-2-sulfonic acid with copper or copper salt with hexahydroaniline of the formula

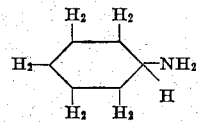

3. As a new product the wool dyestuff of the anthraquinone series corresponding probably to the formula

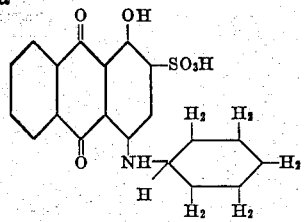

which product is when dry a blackish blue powder, soluble in concentrated sulfuric acid with a light orange tint which becomes green upon the addition of para formaldehyde especially at elevated temperature, dyeing wool bluish violet shades of a remarkable fastness and levelling property.

ERNST HONOLD.
KLAUS WEINAND.